July 17, 1956   O. W. LIVINGSTON   2,755,422
RECORD-REPRODUCE PROGRAMMING CONTROL SYSTEM FOR ELECTRIC MOTORS
Filed Aug. 14, 1953   5 Sheets-Sheet 2

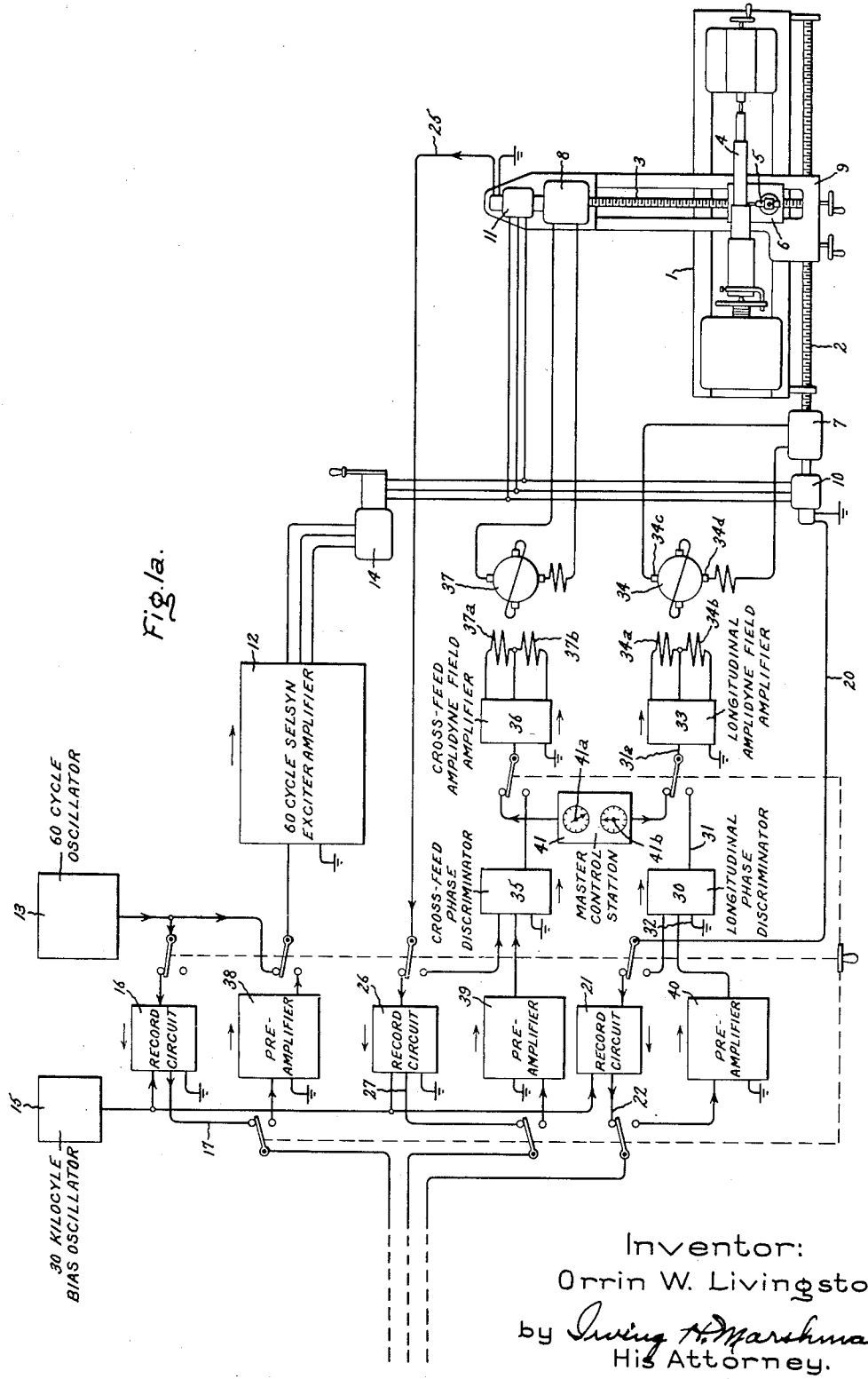

Inventor:
Orrin W. Livingston,
by Irving H. Marshman.
His Attorney.

July 17, 1956     O. W. LIVINGSTON     2,755,422
RECORD-REPRODUCE PROGRAMMING CONTROL SYSTEM FOR ELECTRIC MOTORS
Filed Aug. 14, 1953     5 Sheets-Sheet 3
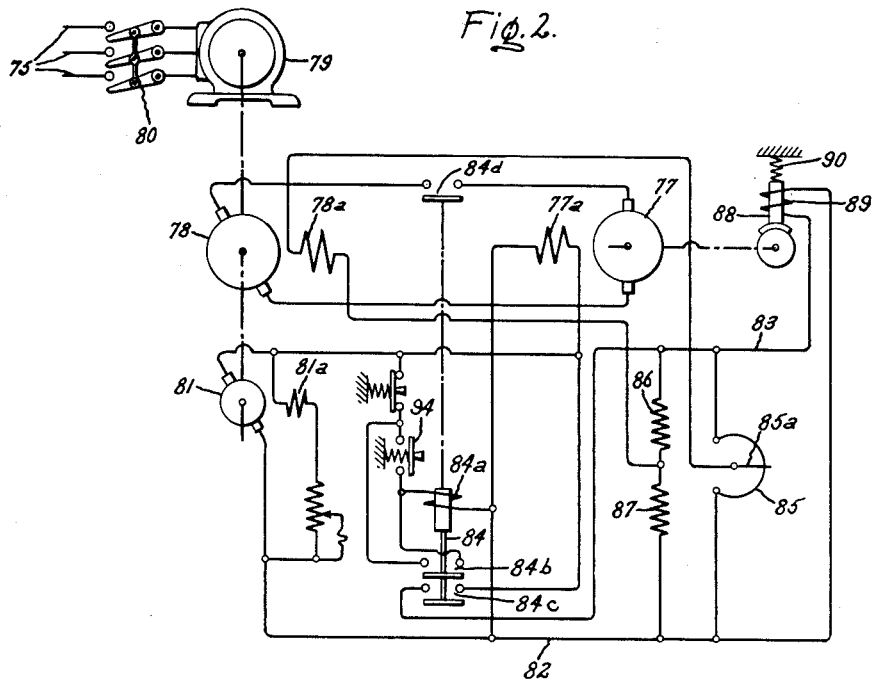
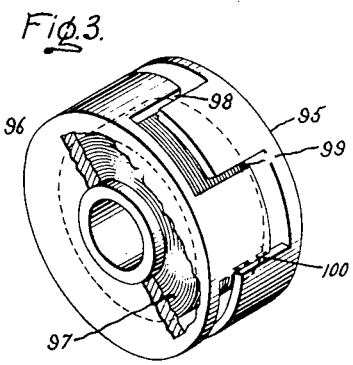
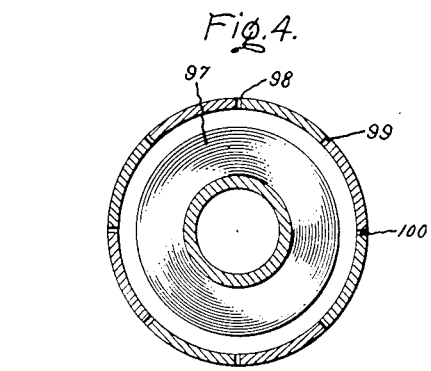
Inventor:
Orrin W. Livingston,
by Irving H. Marshman.
His Attorney.

July 17, 1956  O. W. LIVINGSTON  2,755,422
RECORD-REPRODUCE PROGRAMMING CONTROL SYSTEM FOR ELECTRIC MOTORS
Filed Aug. 14, 1953  5 Sheets-Sheet 4
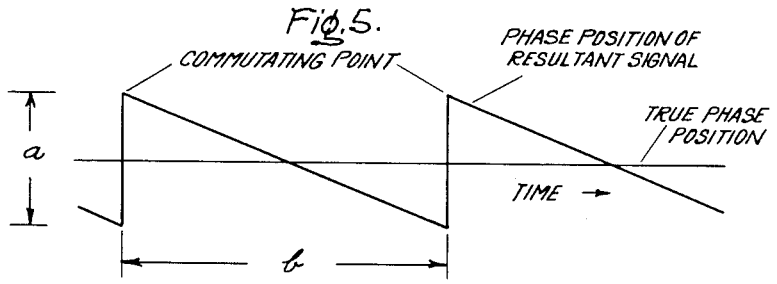
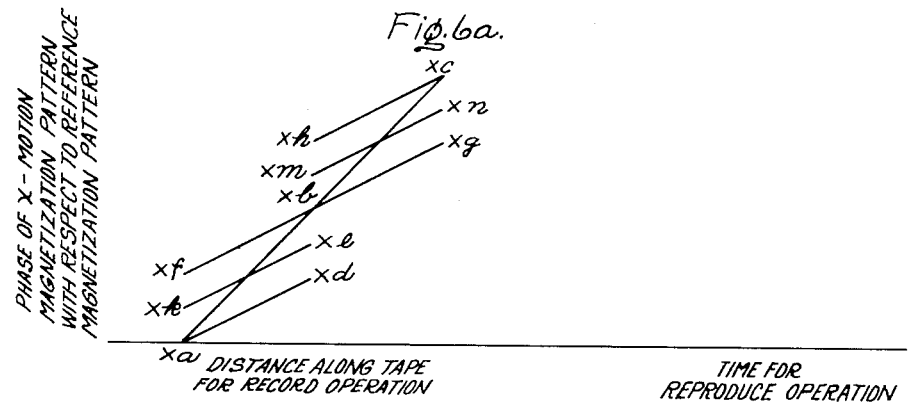
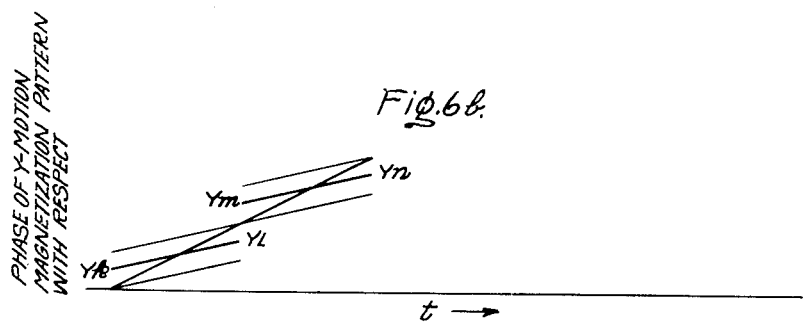
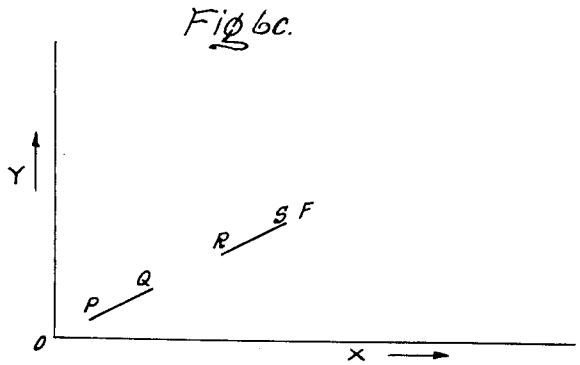
Inventor:
Orrin W. Livingston,
by Irving H. Marshman
His Attorney.

July 17, 1956  O. W. LIVINGSTON  2,755,422
RECORD-REPRODUCE PROGRAMMING CONTROL SYSTEM FOR ELECTRIC MOTORS
Filed Aug. 14, 1953  5 Sheets-Sheet 5

Inventor:
Orrin W. Livingston,
by *Irving W. Marshman*
His Attorney.

United States Patent Office 2,755,422
Patented July 17, 1956

2,755,422

RECORD-REPRODUCE PROGRAMMING CONTROL SYSTEM FOR ELECTRIC MOTORS

Orrin W. Livingston, Scotia, N. Y., assignor to General Electric Company, a corporation of New York Application August 14, 1953, Serial No. 374,312

19 Claims. (Cl. 318—162)

This invention relates to control systems for recording a program of sequential operations involving time-motion patterns and other types of automatic cycles, and playing back the recording to cause the recorded program to produce a corresponding sequence of operations.

More particularly, the invention relates to control systems in which such sequence of operations is recorded on a magnetic tape as a control pattern of alternating polarity magnetization of which the phase relationship with respect to a reference pattern of alternating polarity magnetization, also recorded on the tape, varies with the instant to instant progress of the program which is being recorded, and it has for an object the provision of an improved device for recording the program on the tape to provide greater flexibility in the recording and reproducing operations.

Still more particularly, this invention relates to systems for automatically controlling a machine tool to produce a piece of work by means of a recording on a magnetic tape of a reference alternating polarity magnetization and one or more control polarity magnetizations of variable phase relationship with respect to the reference pattern. A system of this character is disclosed in Patent 2,537,770 Livingston et al. and the present invention is an improvement of the programming control system disclosed therein. In the operation of the system disclosed in this patent, a skilled machine tool operator manually controls the machine tool or a pattern is automatically followed by a tracer control to produce a sample piece of work of which duplicates are subsequently to be made by the machine tool under automatic control of the magnetic tape. Either prior to, or during this initial manual operation of the machine tool, a reference alternating voltage is obtained from a source of constant frequency alternating voltage and is recorded on the tape while it is running at constant speed as a reference pattern of alternating polarity magnetization. For each controlled element of the machine tool, such for example as its cross-feed or its longitudinal-feed, a control alternating voltage of which the instant to instant phase relationship with respect to the reference voltage represents the instant to instant position of such controlled element is produced by means of a selsyn geared to such controlled element and excited from the constant frequency source. This control voltage is also recorded on the tape while it is running at constant speed, as a control pattern of alternating polarity magnetization.

When the tape is played back to effect automatic control of the machine tool to duplicate the original sample work piece made by manual control or by automatic tracer control, the instant to instant phase relationships of the reproduced control voltage and the voltage developed by the selsyn associated with the controlled element with respect to the reproduced reference voltage are compared by means of an electronic discriminator. Any difference of this phase relationship from that required to indicate correct position of the controlled element at any instant of time represents an error between the required position of such element of the machine tool at such instant and its actual position. The electronic discriminator responds to any such difference in these phase relationships to produce an error voltage which is utilized to initiate and control a correction in the position of the controlled element.

The system of the Livingston et al. patent leaves something to be desired with respect to varying the speed of recording and reproducing. For example, if it is desired to reduce the speed of playback to half speed, the frequency of the reproduced reference voltage, and likewise the frequencies of the reproduced control voltages, are automatically reduced to half value as the tape speed is reduced. This frequency change produces undesirable complications:

1. The phase splitting circuit normally used to obtain the polyphase excitation for the selsyns from a single phase source of reference alternating voltage must be adjusted for the new frequency.

2. The filter of the discriminator must be adjusted to increase the active capacitance to provide satisfactory operation at the lower frequency. Alternatively, it may be designed for the lower frequency and the unnecessarily long time delay tolerated at the higher frequencies.

3. The amplitude of the reproduced voltages is reduced to one-half. If this is not corrected both the selsyns and the discriminators operate at reduced voltage which reduces the velocity error coefficient of the positioning system.

Not only may it be desirable to reduce the speed of playback to one-half or less, but it may also be necessary to reduce the speed to zero if some difficulty in the operation of the controlled machine tool is encountered. With the system of the Livingston et al. patent, both the frequency and the amplitude of the reproduced reference and control alternating voltages decrease to zero under this condition. This leaves the system with zero synchronizing ability at zero tape speed. Owing to this difficulty, a playback program normally starts with a section of tape in which all motions are presumed to be at zero speed. This permits the tape to come up to speed, the frequency of the various control voltages obtained from the tape to reach normal, and the various motions of the controlled machine tool to synchronize. Then the program of motion is carefully started, with attention being given to limiting the maximum accelerations to values which will not cause loss of synchronization. Similarly, in recording a "planned stop," all motions are brought to zero speed and left there for several seconds before the tape is stopped. Upon continuation of the recording another period of zero motion is observed as for an initial start.

Although these planned starts and stops circumvent the limitations of the system of the Livingston et al. patent under normal operating conditions, any unplanned stops or starts during the reproduce program may result in periods of bad out-of-correspondence if not actual permanent error in any motion that is not at zero speed at the time of the unplanned stop.

Accordingly, a further object of the invention is the provision of improvements on the system of the patent which makes it possible to reproduce the reference alternating voltage and the control alternating voltages at constant frequency and constant amplitude for all speeds of the tape from maximum to zero.

A further object of the invention is the provision of improvements on the system of the patent which make it possible to record the reference alternating voltage and the control voltages on a magnetic tape as alternating polarity magnetization patterns of which the wavelengths are maintained substantially constant irrespective of the speed of the tape, i. e., for all speeds of the tape from zero to maximum.

In carrying the invention into effect in one form thereof, the record-reproduce head assembly is provided with a rotatably mounted drum. Supply rolls and delivery rolls are mounted in operative relationship with respect to the drum for transporting a multi-channel magnetic tape over it in contact with a portion of its cylindrically curved surface, and separate motors are provided for driving the drum and the tape transport rolls. The drum is provided with as many axially disposed sections as the tape has channels, and an electromagnetic record-reproduce unit is embodied in each section. Each section has a core structure which is provided with a magnetizing coil and a plurality of air gaps at the curved surface of the drum which are circumferentially equally spaced from each other. The motors which drive the drum and the tape transport rolls are interconnected either electrically or mechanically and controlled so that the difference between the surface speed of the transport rolls in a forward direction and the surface speed of the drum in the forward direction is substantially constant. This constant difference is the relative speed of the tape and drum.

External connections provide for supplying to the coils of the various sections of the drum alternating voltages of variable phase relationship with respect to each other, which are recorded on the tape in the form of a number of channels of alternating polarity magnetization patterns of variable phase relationship with respect to each other. Upon playback, these variable phase relationships are converted into control voltages which cause the machine tool or other controlled device to perform the desired sequence of operations.

In one specific form of the invention the interconnecting means between the motors, the drum and the transport rolls takes the form of a mechanical differential device having an input member and two output members. One of the output members is connected to drive the supply and delivery rolls and the other is connected to the rotatably mounted drum. One of the motors is connected to drive the input member of the differential device and the other may be connected to drive either the drum or the transport rolls.

In other forms of the invention one of the motors is directly connected to drive the drum and the other is directly connected to drive the transport rolls. The motors are electrically interconnected and controlled to maintain the relative speeds of the drum and tape substantially constant.

For a better and more complete understanding of the invention, reference should now be had to the following specification and to the accompanying drawings of which:

Fig. 1A is a schematic block diagram representation of a portion of a programming control system embodying the invention.

Fig. 2 is a simple schematic diagram of an electrical control system for controlling the operation of one of the motors of the embodiment illustrated in Fig. 1.

Fig. 3 is a plan view in perspective of a detail of a modification of the head assembly.

Fig. 4 is an end view of such detail.

Figs. 5, 6a, 6b and 6c are charts of characteristic curves which facilitate an understanding of the invention.

Figure 1B:
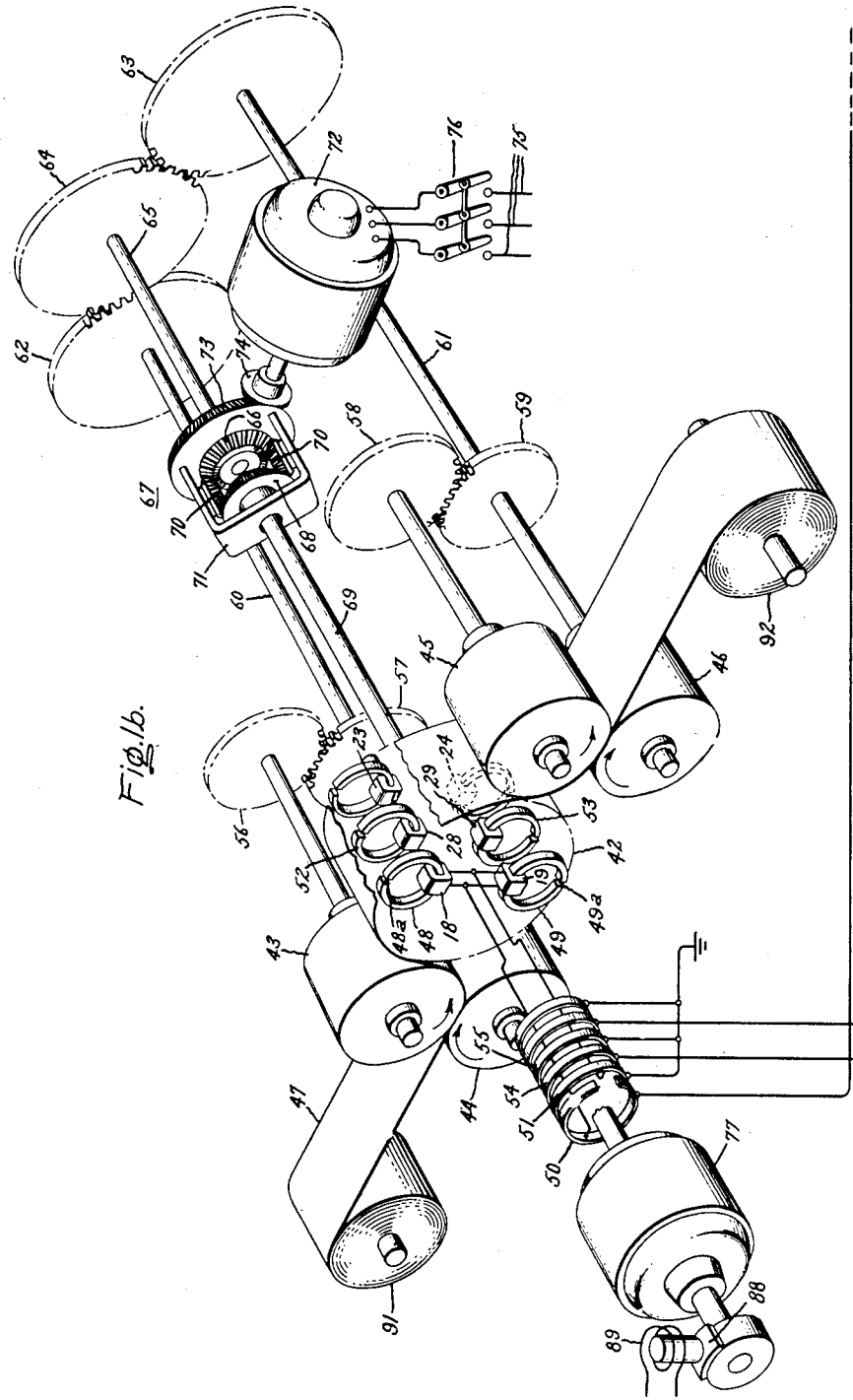
Fig. 1B is a diagrammatical representation in perspective of the remaining portion of such programming control system.

In illustrating the invention in one form thereof, it is shown as embodied in a control system for a production lathe. It may, however, be embodied in a control system for any type of machine tool, process, or apparatus, for automatically controlling a program of time-motion patterns, speed, positions, or other controllable quantities or characteristics.

Referring now to the drawing, a production lathe 1 has a longitudinal feed lead screw 2 and a cross feed lead screw 3. A workpiece 4 is supported in the usual manner between centers in the headstock and the tailstock and is engaged by a cutting tool 5 which is mounted in a toolholder on the cross-feed slide 6.

The longitudinal lead screw 2 is driven by suitable driving means which is illustrated as a direct current motor 7. Similarly, the cross-feed lead screw 3 is driven by suitable driving means which is illustrated as a direct current motor 8.

For the purpose of producing an alternating voltage of which the phase with respect to a reference alternating voltage varies in response to the longitudinal movement of the carriage 9, a rotary induction device 10 is provided. This device is preferably a selsyn which is physically similar to a wound rotor induction motor. It has a rotor member which is mechanically coupled to the longitudinal lead screw 2 and a stator member. A three phase distributed winding (not shown) is mounted on the stator member and an inductively related single phase winding is mounted on the rotor member. This arrangement of the windings may be reversed, if desired. The rotor member of a similar rotary induction device 11 is mechanically coupled to the cross-feed lead screw 3.

During the recording operation, a three phase alternating voltage is supplied to the three phase primary windings of rotary induction devices 10 and 11 from a selsyn exciter and amplifier unit 12 which in turn is supplied from an oscillator 13. Although the oscillator 13 is illustrated conventionally and may be of any suitable type, it is preferably an electronic oscillator of which the circuits are illustrated in detail in Fig. 3 of the Livingston et al. patent. The oscillator may be adjusted, i. e., tuned for oscillation at a relatively low frequency which is assumed to be 60 cycles per second. The single phase oscillatory output voltage is supplied to the input circuit of the selsyn exciter amplifier unit 12. Preferably this amplifier unit is an electronic amplifier of the type illustrated in Fig. 9 of the Livingston et al. patent. A balanced three phase voltage is produced at the output terminals of the amplifier and this three phase voltage is supplied to the primary windings of the rotary induction devices 10 and 11 to which the output terminals are connected through a phase shifting device 14.

During recording it is desirable to supply to the record-reproduce head coils a voltage of relatively high frequency, e. g., 30,000 cycles per second. Owing to its relatively high frequency, this voltage is not recorded. Its purpose is to overcome the effect of hysteresis in the magnetic layer of the tape and thus to assure faithful linear reproduction of the lower frequency voltages which are recorded. This high frequency bias voltage is obtained from a suitable source, such as the oscillator 15 which is illustrated conventionally in Fig. 1A of the drawing and is illustrated in detail in Fig. 2 of the Livingston et al. patent. Its output is supplied to a record circuit 16 in which it is mixed with the low frequency reference voltage which is supplied from the low frequency oscillator 13. This record circuit is preferably of the type illustrated in Fig. 4 of the Livingston et al. patent. One output terminal is grounded and the other is connected through a conductor 17 and the contacts of a record-play switch to one terminal of the record-reproduce head coils 18 and 19 of which their opposite terminals are grounded. Thus there is supplied to the coils 18 and 19 an alternating voltage having a 30,000 cycle component and a 60 cycle component. The 60 cycle component is recorded as a pattern of reference alternating magnetization.

The single phase secondary winding of the rotary induction device 10 is connected through a conductor 20 and the contacts of a record-play switch to a record circuit 21 in which the low frequency voltage induced in the secondary winding of the rotary induction device is mixed with a high frequency voltage obtained from the bias oscillator 15. This mixed alternating voltage is supplied through the output conductor 22 and contacts of a record-play switch to record-reproduce head coils 23 and 24 and the low frequency component of the mixed voltage is recorded on the tape.

Similarly, the single phase secondary winding of the rotary induction device 11 is connected through a conductor 25 and contacts of a record-play switch to a record circuit 26 in which the low frequency secondary voltage of the rotary induction device is mixed with the high frequency voltage obtained from the bias oscillator 15. The mixed voltage is supplied through conductor 27 and contacts of a record-play switch to the record-reproduce head coils 28 and 29 and the low frequency component is recorded on the tape as a pattern of control alternating polarity magnetization. The record circuits 21 and 26 are identical with the record circuit 16.

During the playback operation the voltages induced in one or the other of the coils 23 or 24 is compared with the secondary voltage of rotary induction device 10 and instantaneous differences in the phase relationship of the two voltages is utilized to control the direct current motor 7 which drives the longitudinal feed screw 2. To detect differences in the phase relationship of these two voltages, a phase discriminator 30 is provided. Although any suitable type of phase discriminator may be employed, it is preferred to use the electronic phase discriminator which is illustrated in Fig. 6 of Patent 2,537,770. The characteristic of this discriminator as described in the patent is that for in-phase voltages supplied to the discriminator from the rotary induction device 10 and from one or the other of the coils 23 or 24 the voltage at the output conductors 31 and 32 is a direct voltage which is maximum and positive at conductor 31. With the input voltage from the rotary induction device 10 lagging the input voltage from the coil 23 or 24 90°, the output voltage will be zero, and for 180° lagging phase displacement the direct output voltage is maximum and negative at the conductor 31. For intermediate phase relationships between in-phase and 90° lagging, the output voltage has corresponding intermediate values and is positive at conductor 31. Similarly, for intermediate phase relationships between 90° lagging and 180° lagging, the output voltage has corresponding intermediate values and its polarity is negative at conductor 31. These relationships are illustrated graphically in Fig. 10 of Patent 2,537,770.

Figure 8:
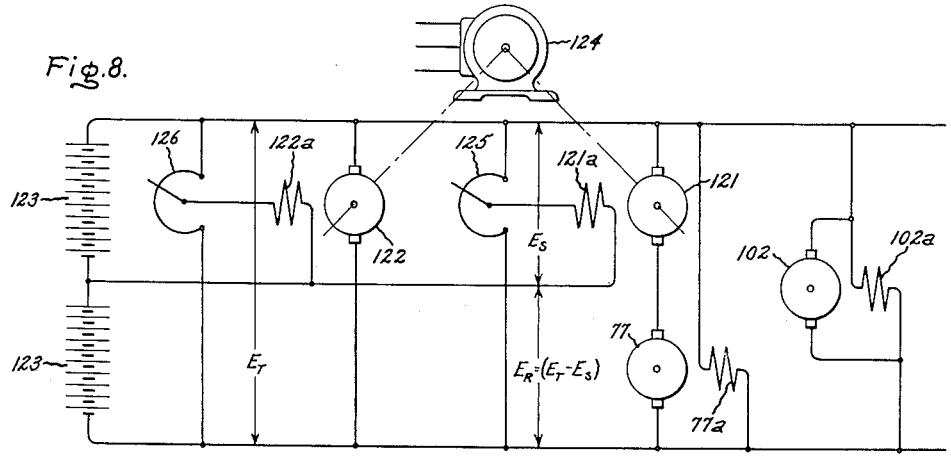

The output voltage of the discriminator 30 is amplified by means of a suitable electronic amplifier such, for example, as the electronic amplifier illustrated in Fig. 8 of the Patent 2,537,770. This amplifier has two output circuits of which the first is connected to the control field winding 34a of an amplidyne generator 34 and the other is connected to the opposing control field winding 34b. The characteristic of this amplifier is that with zero output voltage of the discriminator supplied to its input circuit, the two output voltages will be equal and opposite and consequently the two control field windings 34a and 34b of the amplidyne will be equally and oppositely energized; the net excitation will be zero and the voltage at the load axis brushes 34c and 34d will be zero. When the output voltage of the discriminator 30 is maximum and positive at conductor 31a, the current supplied to the control field 34b will be increased to a maximum and the current supplied to control field 34c will be correspondingly reduced thereby to produce a maximum net excitation of the amplidyne and a maximum output voltage which may be assumed to be positive at load brush 34c. Similarly, when the voltage supplied to the input of the amplifier is maximum and negative at the conductor 31a, the voltage at the load axis brushes will be maximum but of reversed polarity. The load axis brushes of amplidyne 34 are connected to the armature of the longitudinal feed motor 7.

A phase discriminator 35 which is in all respects identical with the phase discriminator 30 is provided for producing a direct control voltage during playback in response to differences in phase between the voltages induced in the secondary single phase winding of rotary induction device 11 and the voltage induced in the record-reproduce head coil 28 or 29. This control voltage is amplified by means of an amplifier 36 which is in all respects identical with the amplifier 33. From the output circuit of amplifier 36 voltages are supplied to the control field windings 37a and 37b of amplidyne 37. The load axis brush voltage of amplidyne 37 is supplied to the armature of the D.-C. motor 8 which drives the cross feed lead screw 3.

Between the reference voltage record-playback head coils 18 and 19 and the input to the amplifier unit 12 is connected a preamplifier unit 38 which is used only during the playback operation. It is illustrated conventionally in Fig. 1A. It is preferably of the type which is illustrated in Fig. 5 of the Livingston et al. patent. The voltage induced in the coil 18 or in the coil 19 during playback is supplied through the contacts of a record-playback switch to the input circuit of the amplifier, and the amplified output voltages are supplied through contacts of a record-playback switch to the input of the selsyn exciter amplifier unit 12. Similar preamplifier units 39 and 40 are connected between the record-playback head coils 23 and 24, and the longitudinal phase discriminator 30, and between the coils 28 and 29 and the cross-feed discriminator 35.

For the purpose of controlling the operation of the machine tool manually, a suitable master control station 41 is provided. Although any suitable type of master control station accessory may be utilized, it is preferred to use a control station of the type which is illustrated in detail in Fig. 7 of Patent 2,537,770. By rotating the manual control knobs 41a and 41b in one direction or the other from a central zero position, direct voltage signals reversible in polarity and variable in magnitude are supplied to the input circuits of the amplidyne field amplifiers 33 and 36. As a result, the feed drive motors 7 and 8 will rotate to position the tool. Each of the motors will rotate in a direction corresponding to the direction of rotation of the corresponding control knob from its central zero position and at a speed corresponding to the amount of the displacement.

As shown in Fig. 1B the magnetic tape record-playback head assembly unit comprises a plural section rotatably mounted drum 42 together with a pair of supply rolls 43 and 44 and a pair of delivery rolls 45 and 46 mounted on opposite sides of the drum with respect to its axis of rotation. A plural channel magnetic tape 47 is grasped by the supply rolls 43 and 44 as it enters the head assembly and by the delivery rolls 45 and 46 as it leaves. These rolls are geared together so that they rotate in the directions indicated by arrows in Fig. 1B. Thus they serve to transport the tape 47 in a left to right direction over the drum 42 and in contact with a predetermined portion of its cylindrical surface.

The plural section drum 42 has one section for each channel on the tape. Preferably it is made of a suitable molding compound such, for example, as a thermosetting resin. Each section of the drum has a magnetic core structure. In order to maintain the desired correct spatial relationship between the core structures of all sections of the drum, they are cast into the thermosetting resin in a mold which supports all parts in their correct positions. In Fig. 1B, the core structure for one section of the drum is illustrated as comprising ring-shaped core members 48 and 49 provided with air gaps 48a and 49a at the cylindrically curved surface of the drum and circumferentially displaced 180 degrees from each other. Upon the core members 48 and 49 are wound coils 18 and 19 respectively. These two coils are connected in parallel and may be considered as constituting a single winding from which electrical connections are brought out to slip rings 50 and 51 to provide connection to an external circuit, e. g., to the record circuit 16 or to the preamplifier 38 in the playback circuit, depending on the position of the record playback switch.

A second section of the drum contains the core members 52 and 53 upon which are wound parallel connected coils 28 and 29. Slip rings 54 and 55 to which the coils 28 and 29 are connected provide for connection to an external circuit; e. g., to the record circuit 26 or to the preamplifier 39 in the playback circuit depending on the position of the playback switch. To avoid confusion, only two sections of the drum with their electro-magnetic record-reproduce units and associated slip rings are completely illustrated in the diagrammatic sketch of Fig. 1B. It will be understood, however, that the drum will have as many sections along its axis as the tape has channels and that in each of these sections the combination of electro-magnetic units and associated slip rings illustrated in the first and second sections is duplicated.

Preferably, the drum 42 has approximately the same diameter as the supply and delivery rolls, although for the purpose of clearly illustrating the electro-magnetic record-reproduce unit, it is illustrated in Fig. 1B as having a diameter approximately twice that of the rolls. The drum 42 and the rolls 43, 44, 45 and 46 are mounted for rotation in a suitable supporting frame (not shown). The slip rings which provide electrical connection from the electro-magnetic units to external circuits are mounted on the shaft of the drum 42 preferably within a housing member (not shown).

The rolls 43, 44, 45 and 46, are geared together so that they rotate in the directions illustrated in Fig. 1B and thus serve to transport the tape in a left to right direction. As shown, the roll 43 is provided with a gear 56 which meshes with a similar gear 57 on the shaft of roll 44. Both gears have the same number of teeth and equal pitch diameters which are also equal to the roll diameters. Rolls 45 and 46 are also provided with a similar pair of meshing gears 58 and 59 as illustrated in Fig. 1B.

The lower rolls 44 and 46 are respectively provided with shaft extensions 60 and 61 which are journaled for rotation in suitable bearings in the supporting frame. These shaft extensions are geared together by means of gears 62 and 63 with which they are respectively provided and an intermediate gear 64 with which they are in mesh. This intermediate gear is keyed to one end of a shaft 65 of which the other end is keyed to an output gear 66 of a mechanical differential device 67. A second output gear 68 is keyed to one end of a shaft 69 of which the other end is keyed to the drum 42 of the record-reproduce head. The output gears 66 and 68 are interconnected by means of planetary gears 70 which are mounted for rotation about their own axes on a cage member 71 which in turn is mounted for rotation about the axes of shafts 65 and 69.

The cage member is driven by means of a suitable constant speed motor 72 to which it is mechanically connected through bevel gears 73 and 74. Preferably, the motor 72 is a synchronous motor which is supplied from a suitable source of alternating voltage such as the three-phase supply conductors 75 to which it is arranged to be connected by means of a suitable switch 76.

An adjustable speed motor 77 is mechanically connected to the shaft of the drum 42 of the record-reproduce head assembly. Thus the rolls 43, 44, 45 and 46, which are connected to the output gear 66 of the differential device are driven by the constant speed motor 72 and the drum 42 is connected to the output gear 68. Owing to the action of the differential gearing, the constant speed motor alone cannot control the speed either of the drum or of the rolls, but only the sum or difference, depending on the sense considered, of their speeds. However, the adjustable speed motor 77 which is directly connected to the drum 42 and also to the output gear 68 of the differential does provide definite control of the speed of the drum 42. Alternatively, the adjustable speed motor could have been connected to the rolls 43, 44, 45 and 46, and the same ultimate operation attained.

The adjustable speed motor 77 is preferably a direct current motor of which the armature is supplied with adjustable voltage from a suitable source, such for example as the adjustable voltage generator 78, as illustrated in Fig. 2. This generator is driven at a speed which is preferably substantially constant by suitable means such as an induction motor 79 which is supplied from a suitable source of alternating voltage such as the source 75 from which the synchronous motor 72 is also supplied. A switch 80 serves to connect the motor 79 to the source.

Also driven by the motor 79 is an exciter 81 which is provided with a self-excited field winding 81a. It furnishes excitation to the separately excited field winding 77a of the adjustable speed motor and to the separately excited field winding 78a of the adjustable voltage generator.

An excitation supply conductor 82 is connected to one terminal of the exciter and connection of a second supply conductor 83 is completed to the opposite terminal by means of a contactor 84 having an operating coil 84a and three normally open contacts 84b, 84c, and 84d. A rheostat 85 and a voltage divider comprising two series connected fixed resistors 86 and 87 of equal ohmic value are connected across the excitation supply conductors 82 and 83. The generator field winding 78a is connected between the slider 85a of the potentiometer and the midtap of the voltage divider. Rotation of the slider 85a of the rheostat from its central zero voltage position varies the voltage of the generator over a wide range of positive and negative values from zero to maximum and thus serves to adjust the speed of the motor 77 from zero to maximum in the forward and reverse directions of rotation.

The motor 77 is provided with a solenoid brake which is illustrated as comprising a brake shoe 88 and an operating solenoid 89 which is supplied from the exciter 81. A brake spring 90 sets the shoe against the drum when the solenoid is de-energized.

With the foregoing understanding of the elements and their organization the operation of the system will readily be understood from the following detailed description.

The multiple channel magnetic tape 47 is unwound from a full reel 91 and threaded through the record-playback head assembly and attached to the winding-up reel 92. The winding up reel is driven by suitable driving means such as an electric motor (not shown) and tension in the tape is maintained by means of an electric motor connected to the unwinding reel 91 and driven thereby as a generator to produce regenerative braking. The driving motors for the reels constitute no part of the present invention and consequently they are omitted from the drawing in the interest of simplicity.

Initially, the adjustable speed motor 77 is deenergized and its rotor and drive shaft are held stationary by means of the brake 88, 89 with the drum 42 in the position in which it is illustrated in Fig. 1B, i. e., with the air gaps 48a and 49a located on a vertical diameter.

To start the operation, the operator chucks his stock workpiece 4 and operates the record-playback switch 93 to the record position with all its movable contacts engaging the upper stationary contacts R. The tool 5 is positioned to a known zero point or initial reference point. This is accomplished with assistance of the usual micrometer dials with which the lathe is provided. The movement of the tool to the reference or zero point is effected by operation of the speed control knobs 41a and 41b of the master control station 41.

Once the tool is located at the reference point, the recorder is turned on, i. e., the synchronous constant speed motor 72 is connected to the source 75 by means of switch 76 and the magnetic tape begins to move past the coils 18 and 19, 23 and 24, and 28 and 29, of the record-reproduce head assembly of which the drum 42 is being held stationary. A 60-cycle signal voltage from the oscillator 13 is supplied through the record contacts to the record circuit 16. In this circuit it is reduced in magnitude and mixed with the 30,000-cycle bias voltage. The resulting signal voltage is supplied through the conductor 17 and contacts of the record switch to the coils 18 and 19 of the head assembly. Since the drum 42 is stationary in the position in which it is illustrated, only the coil 18 has any effect on the tape at this time. The 60-cycle component of the voltage supplied to the coil 18 causes a pattern of reference alternating polarity magnetization to be induced and recorded on the tape. The 30,000-cycle component, owing to its high frequency, is not recorded.

A 60-cycle voltage from the oscillator 13 is also supplied through the contacts of the record switch to the selsyn exciter amplifier unit 12. The three-phase output voltage of this unit is supplied to the stator windings of the cross-feed and longitudinal feed rotary induction devices 10 and 11, respectively.

The phase of the single-phase voltage induced in the rotor winding of the cross-feed rotary induction device 11 with respect to the reference voltage which is being recorded on the tape represents the position of the cross feed and thus represents the position of the tool on the cross-feed axis. This single-phase rotor voltage is supplied through conductor 25 and contacts of the record switch to the record circuit 26. In this circuit it is reduced in magnitude and mixed with the 30,000-cycle bias voltage. The resulting mixed signal is supplied through conductor 27 and contacts of the record switch to the coils 28 and 29 and the 60-cycle component is recorded on the tape. Thus there is recorded on the tape a pattern of control alternating polarity magnetization of which the phase with respect to the reference alternating magnetization represents the position of the tool along the cross-feed axis.

In a similar manner, a position signal voltage from the longitudinal feed rotary induction device 10 is supplied through conductor 20 to the record circuit 21 and is mixed with the 30,000-cycle bias voltage. The resulting voltage is supplied to the coils 28 and 29 and the 60-cycle component is recorded on the tape.

The workpiece may be turned to the desired finished shape by manipulating the control knobs 41a and 41b of the master control station as explained in the foregoing. Alternatively, an automatic contouring control system such as disclosed in Patent 2,492,731—Branson may be utilized to follow the outline of a pattern and control the motors 8 and 7 to position the tool and simultaneously to effect the recording on the tape.

Thus while the work is being continuously turned the instantaneous longitudinal and cross-feed positions are being recorded. Simultaneously, the reference voltage signal is being recorded.

If the longitudinal feed is stationary, the phase of the signal voltage recorded on the tape by the coil 23 will not change with respect to the reference voltage signal recorded by the coil 18. This constant relationship of the phase of the recorded longitudinal feed signal voltage and the recorded reference signal voltage continues as long as the longitudinal feed is stationary. If during a succeeding instant of time the longitudinal feed moves a predetermined amount, the rotor of the rotary induction device 10 is rotated a corresponding amount and consequently the phase of the voltage induced in its single-phase rotor winding is advanced or retarded depending upon the direction of the rotation. As the movement of the longitudinal feed continues, the phase of the voltage signal which is recorded varies from instant to instant with respect to that of the reference voltage so that there is recorded on the tape a pattern of varying phase relationships between a reference alternating voltage and a control alternating voltage which represents the position of the tool from instant to instant on the axis of the longitudinal feed. Similarly, as the position of the tool changes along the axis of the cross feed, the phase of the voltage induced in the rotor winding of the rotary induction device 11 is advanced or retarded depending on the direction of the movement of the tool. As the movement continues, the phase of the cross-feed voltage signal which is recorded on the tape varies with respect to the recorded reference voltage so that a pattern is recorded of varying phase relationships between a reference alternating voltage and a control alternating voltage. This pattern of phase relationships represents the instant to instant position of the tool on the axis of the cross feed.

When the turning operation is completed, the tool is returned to the zero or reference position in which it was located at the beginning of the recording operation. The tape 47 is rewound on the storage reel and the switch 93 is moved to the playback position in which the movable contacts engage the lower stationary contacts P. The complete workpiece is replaced in the lathe by a piece of stock and the recorder is turned on and the tape is again drawn from the storage reel 91 past the record and playback head and wound upon the takeup reel 92.

Alternating voltages will now be induced in the coils 18, 23, and 28, in accordance with the voltages which were previously recorded. The 60-cycle reference voltage which is induced in the coil 18 is amplified by the pre-amplifier 38 and is supplied to the input of the selsyn exciter and amplifier unit 12. The three-phase output voltage of this unit is supplied to the three-phase stator windings of the longitudinal and cross-feed rotary induction devices 11 and 10, respectively.

The phase of the voltage which is induced in the rotor winding of the cross-feed rotary induction device 11 represents the present instantaneous position of the tool on the cross-feed axis. This signal voltage is supplied to one input circuit of the cross-feed phase discriminator 35. At the same time, a control voltage is induced in the coil 28 in accordance with the recorded cross-feed control voltage. This control voltage which is induced in the coil 28 is amplified by the pre-amplifier 39 and the amplified voltage is supplied to the second input of the cross-feed discriminator 35. The phase of this voltage at each instant represents the recorded or the desired position of the tool on the cross-feed axis at that instant.

The cross-feed discriminator 35 compares the phases of the these two control voltages which are supplied to its input circuits. As previously explained, the output of the phase discriminator 35 is a direct voltage which is proportional to the difference in phase between the desired and the actual present position control voltages. At any instant in which the tool is in the desired position on the cross-feed axis, the output voltage of the phase discriminator should be zero so that zero voltage shall be supplied to the cross-feed motor 8. However, the output voltage of the phase discriminator is zero only when the input voltages are displaced in phase from each other by 90°. To produce this required 90° phase displacement when the tool is in the desired instantaneous position on the cross feed, the phase shifting device 14 which is included in the connections between the selsyn amplifier 12 and the rotary induction devices 10 and 11 is actuated. It is preferably a three-phase differential selsyn device, i. e., it has a distributed three-phase stator winding and a distributed three-phase rotor winding. At the beginning of the playback operation the rotor member is rotated sufficiently to displace the voltage supplied from the rotor winding of the rotary induction device 11 to one input of the phase discriminator 35 90° with respect to the reproduced voltage supplied to the other input. Thus the two voltages supplied to the inputs of the phase discriminator will be 90° out of phase when the tool is in the desired instantaneous cross-feed position and the output voltage of the discriminator will be zero and the cross-feed motor 8 will be at standstill.

As the tape passes through the record-playback head assembly, the phase of the voltage induced in the coil 28 will change in accordance with the phase pattern of the recorded cross-feed voltage.

Consequently, an error tends to develop in the instantaneous position of the tool on the cross feed which results in a departure from the 90° phase relationship of the voltages supplied to the input circuits of the discriminator 35. This produces a voltage at the output of the discriminator of which the magnitude is proportional to the amount of change in phase of the input voltages with respect to each other and of which the polarity depends upon the sense of the change, i. e., an increase or decrease in the 90° relationship. Responsively to this output voltage, the motor 8 is energized for rotation in a direction to reduce the error in the position of the tool and simultaneously to rotate the rotor of the rotary induction device 11 to restore the 90° relationship of the input voltages which exists when the present position of the tool coincides with the desired position. Although this position correcting operation is described as a single step taking place in an instant of time, it is actually in continuous progress during the playback operation. Thus by tending to reduce the error at all times, the system causes the tool to follow the same cross-feed motions that were recorded.

The correct positioning of the tool in the longitudinal direction is accomplished in a similar manner. The present position control voltage is induced in the rotor winding of the rotor induction device 10 and supplied to one input circuit of the longitudinal phase discriminator 30 and the recording in the longitudinal channel of the tape induces in the coil 23 a control voltage which represents the desired longitudinal position of the tool. It is amplified by the pre-amplifier 40 and supplied to the other input of the phase discriminator 30. The manner in which the corrections in the longitudinal position of the tool are made in successive instants of time is identical with that described for the cross feed and a repetition of the described operation is therefore omitted.

Thus, the tool is continuously positioned along the cross and longitudinal feeds following the same program of motion that was recorded. The result is a piece of work that is identical to the first piece which was made by manual control of the lathe or alternatively by automatic control produced by a contouring control system.

During the foregoing playback or reproduce operation just described, the drum 42 remained stationary and the tape was transported from left to right at such speed that a 60-cycle reference voltage was obtained from the coil 18 of the record-reproduce unit.

The pattern of magnetization on the tape may be thought of as a series of regularly spaced north and south magnetic poles separated from each other by regions in which the magnetic field intensity smoothly changes from a maximum of one polarity to a maximum of the opposite polarity. The distance between successive maximums of one polarity, that is to say the distance between successive north poles, must be constant since the tape speed and the frequency are constant. This distance is herein referred to as a "wavelength." In Fig. 1B, the circumference of the drum is made equal to two wavelengths of the reference pattern of magnetization of the magnetic tape, or twice the distance between successive north poles of the recorded reference pattern.

In operation with the drum at standstill, the tape slides over the drum at a rate of 60 north poles past the gap 48a of the upper pick-up element every second.

If it is desired to reduce the speed of the tape or to stop it during the playback operation, the adjustable speed motor 77 is energized and brought up to speed. This is accomplished by momentarily depressing the start push button switch 94 to complete an energizing circuit for the operating coil 84a of contactor 84. In response to energization, contactor 84 picks up and closes its normally open contacts 84b, 84c and 84d. Contacts 84b in closing complete a sealing-in circuit around the contacts of the push button switch 94 which may now be released. Contacts 84c in closing complete an energizing circuit for the brake operating coil which acts against the tension of the spring 90 and releases the shoe 88 from engagement with the brake drum. Contacts 84d in closing complete the connection of the armature of the adjustable speed motor to the armature of the adjustable voltage generator 78. The slider 85a of the rheostat 85 is now rotated in a counterclockwise direction from the central position in which it is illustrated to cause to be supplied to the field winding 78a of the generator a voltage of proper polarity to cause the adjustable speed motor 77 to rotate the drum in a counterclockwise direction. It is assumed that the speed of the adjustable speed motor is set so that the drum 42 starts to rotate slowly. Since the speed of the synchronous motor cannot change, any change in the speed of the drum must cause a change in the speed of the four tape transport rolls 43, 44, 45, and 46, through the action of the interconnecting differential gearing 67.

The sense of the gearing is such that as the counterclockwise rotational speed of the drum increases, the left to right transport speed of the tape is decreased. Also, it is assumed that the numerical ratio of the gearing is such that the change in speed of a point on the surface of the drum will be exactly equal to and opposite in sense to the change in speed of the tape.

If these conditions are fulfilled, the counterclockwise rotation of the drum maintains the relative velocity of the tape and the drum constant although the tape speed has been decreased, i. e., the difference between the surface speed of the transport rolls and the surface speed of the drum is maintained substantially constant. In other words, the decreasing clockwise speed of the tape is exactly offset by the increasing counterclockwise direction of rotation of the drum. Under these conditions, 60 north poles per second continue to pass the air gap 48a of the upper pick-up element and the frequency of the voltage generated in coil 18 remains 60 cycles per second. Since the half circumference of the drum was equal to one wavelength, it will be seen that as the upper air gap 48a parts company with the tape after a quarter revolution, the air gap 49a of the lower pick-up unit is just beginning to make contact with the tape one wavelength away. Thus the reference pattern of magnetization is picked up first by one pick-up element and then by the other as the drum continues to rotate, but the frequency continues to be 60 cycles.

The speed of the adjustable speed motor 77 may now be increased and the tape speed will be correspondingly reduced. This may be continued until the tape is actually standing still. Under all of these conditions, however, a 60-cycle alternating reference voltage of essentially constant amplitude for exciting the selsyns and discriminators of the control system will be induced in the coils 18 and 19 and will appear at the slip rings 50 and 51.

An identical operation is taking place in the other sections of the drum 42. For example, in the section which includes the pick-up elements 52, 28, and 53, 29, a control alternating voltage is being induced in the coils 28 and 29 and appears at the slip rings 54 and 55 as a result of their relative motion with respect to the control pattern of magnetization on the corresponding channel of the tape. This voltage is basically a 60-cycle voltage whose phase relationship with respect to the reference voltage indicates the required position of the tool or the cross feed at a given instant of time. Although the voltages which are induced in the coils 28 and 29 and in corresponding coils of other sections of the head are not always strictly 60-cycle voltages, they will be considered as such and later it will be demonstrated that only insignificant errors result from such assumption. Thus, as the counterclockwise speed of the drum increases, the voltages induced in the coils 28 and 29 also remain essentially 60-cycle voltages but their phase relationship with respect to the reference voltage still represents the true relations recorded on the tape. However, when the tape transport speed has been reduced 50 percent, for example, the controlled program of operation of the machine tool is only going forward at half speed. Similarly when the tape speed has been reduced 10 percent, the speed of all the playback motions of the controlled machine tool is reduced 10%, although the entire playback system is actually operating at essentially 60 cycles. Even when the tape stops, and consequently the entire playback program of the controlled machine tool stops, 60-cycle voltages are obtained from all the channels on the tape with definite fixed phase relationships which hold the various playback motions in a fixed or fully synchronized relationship. Thus, if any disturbing forces tend to move them during this period of zero speed, normal synchronizing torques are developed to maintain their proper position.

From the foregoing, it is seen that the invention makes it possible to reduce the speed of and to stop the playback program at any time at the desire of the operator without any of the difficulties of the system of the Livingston et al. patent. It is also possible to operate at some intermediate speed for an extended period as might be desired, for example, to avoid overloading a cutter in the region of a very heavy cut.

If the counterclockwise speed of the drum is still further increased beyond the point at which the tape speed reaches zero, the tape will actually move backward and the program will actually back up, although, of course, this does not mean that the metal which has been removed by the machine tool is replaced upon the work piece.

If, on the other hand, instead of driving the drum in a counterclockwise direction, it had been driven in a clockwise direction, the speed of the tape through the record-reproduce head assembly would be increased and the speed of the playback increased over the normal recording speed. Thus, in periods of slow movement or light cut, it is possible to double or even triple the program speed as long as the capabilities of the system and the controlled machine tool are not exceeded.

Thus, it is seen that the present invention makes it possible at any time to stop, start, reverse, or proceed, at any desired program speed within the capabilities of the system without loss of synchronism in the system.

The transfer of the voltage pick-up function from the electro-magnetic pick-up unit just leaving the tape to the unit just coming in contact with the tape as the drum rotates is referred to as "head commutation." As previously described, in the case of a voltage of exactly 60-cycle frequency, such as the reference voltage, the commutation causes no distortion or deviation from a sine wave in the resultant voltage which appears at the slip rings 50 and 51. It is pointed out, however, that the voltages from the other control channels are required to portray the continuous movement of the elements of the machine tool by which they were originally produced and recorded and consequently their frequency will deviate slightly from 60 cycles in direct proportion to the velocity of the controlled motion.

To understand the effect on head commutation of such deviation from 60-cycle frequency, the drum may be considered to be rotating slowly counterclockwise so that the head commutation occurs about once every ten cycles of the reference voltage. For convenience, it may be assumed that the frequency of the voltage induced in the coils 28 and 29 by the magnetization pattern in the control channel of the tape is actually 61 cycles. Referring to Fig. 1B, it is noted that as commutation occurs one pick-up unit at the extreme left of its travel loses contact with the tape as the other unit picks up contact with the tape at the extreme right. Thus the point at which information is being extracted from the tape suddenly shifts backward on the tape a distance equal to one-half the diameter of the drum. This is essentially a "stepping back in time" in the playback program equal to the time of one cycle of the 60-cycle reference frequency. If there were absolutely no time delays in the entire playback system, a periodic retrogression of 1/60 of a second in the playback program would occur each time that "head commutation" occurred. This would have the effect of introducing a spurious "ripple position program" to the discriminators. This would result in superimposing upon the time phase relationship between the reference voltage and the voltage obtained from one of the control channels of the tape an additional time phase relationship having a sawtooth shape such as shown in Fig. 5 in which abscissae represent time and ordinates represent the deviation of the phase relationship between the control alternating voltage obtained from one of the control channels of the tape and the reference voltage from the true or correct phase relationship that would be obtained if the drum 42 were stationary and the tape were being transported over it at synchronous speed. In Fig. 5 the ordinate "$a$" represents the change in the phase of the control voltage obtained from one of the control channels with respect to the reference voltage in one cycle of the reference frequency. Consequently, it also represents the distance traveled by the element of the machine tool which is controlled by the control voltage from that particular channel of the tape in one cycle of the reference voltage. The abscissa "$b$" represents a period of time equal to $$\frac{1}{\text{Frequency of commutation}}$$

As explained in the foregoing, commutation is the transfer of the voltage pick-up function from the electro-magnetic record-reproduce unit just leaving the tape to the unit just coming in contact with the tape when the drum is being rotated by the adjustable speed motor. Since commutation in all the channels occurs simultaneously, there is no actual relative position error in the control voltages which are supplied from the different control channels of the tape to the discriminators of the control system. The only undesirable effect is this slight retrogression in the program which in effect calls for the program to "back up" to a set of positions called for 1/60 of a second (for a 60-cycle selsyn system) earlier. Since the distance traveled in this time is small and the time constants of the control system are relatively large with respect to this frequency, little if any adverse effect will be produced.

If at the start of the recording program the adjustable speed motor 77 is started and accelerated while the tape is being transported, at synchronous speed, the tape transport speed decreases as the speed of the adjustable motor increases. However, the relative speed of the drum and tape remains constant. Consequently, the distance between consecutive north poles on the tape remains constant and the relative spacing of the poles in all channels remains the same so that no change has been effected in the starting position indication. As the electro-magnetic record-reproduce element leaves the tape on the left side, another one meets the tape on the right-hand side at a point which is the corresponding point of the magnetic pattern that has already been laid down on a section of tape equal to half the circumference of the drum. However, since this distance is exactly one wavelength of the reference pattern, the record-reproduce unit which is just beginning to make contact with the tape at the right-hand side of the drum merely repeats, i. e., re-records the pattern already recorded with no phase shift.

As the speed of the adjustable speed motor is further increased to increase the speed of the drum and thereby to decrease the speed of the tape transport, these overlap sections which are doubly recorded increase and soon there are triple and quadruple recorded sections. However, the subsequent recordings always fall exactly on top of the previous recording so that no phase change occurs. Finally, a speed of the adjustable speed motor is reached at which the tape transport becomes stationary and the drum, now rotating at synchronous speed continually re-records the same magnetic pattern along the section of tape that is in contact with the drum. Thus, the motion of the tape has been stopped and may be held stationary as long as is necessary without causing any starting or stopping transients on the record. To resume the recording, the speed of the adjustable speed motor is decreased to zero and the tape transport is increased from zero to synchronous speed as a result of the differential action of the mechanical differential gearing.

The operator of the machine tool then proceeds to cause the various motions of the controlled elements of the machine tool to move in a manner that he desires to record for future reproduction purposes. As the various positions of these controlled elements change, the phase of the voltages which are representative of those particular motions change with respect to the reference voltage and the phase of their magnetic patterns which are laid down in the several channels on the tape change in like manner with respect to the reference pattern. During the course of the recording, the operator may reach a complicated point in his program at which he has difficulty in controlling all the motions with the required accuracy at the speed at which he has been working. He may, of course, slow down all the motions and continue the program at low speed, but this would cause a similar slowdown on reproduction which might not be necessary since high speed operation of the machine tool at the complicated point of the program might be well within its capabilities.

Instead the operator may start the adjustable speed motor and bring it up to a speed such that it rotates the drum 42 at half synchronous speed in a counterclockwise direction. This reduces the tape transport speed to half speed also. Under these conditions, each section of tape is traversed twice by the electro-magnetic record-reproduce elements. On the first pass of a record-reproduce element, a magnetic pattern is laid down defining the instantaneous positional relationship with respect to time during an interval of 1/60 of a second under the assumed conditions. On the second pass, the reference pattern is exactly duplicated as previously explained since its frequency is constant and one wavelength on the tape is always equal to the peripheral distance between the two record-reproduce head elements. Simultaneously, in one of the channels in which the voltage produced by a selsyn driven by a controlled element of the machine tool is being recorded, the phase of the recorded magnetic pattern is changing with respect to the reference pattern. This is the same thing as saying that the frequency differs from the reference frequency as a function of the velocity of motion of the element of the machine tool which drives the selsyn from which the voltage is supplied to effect the recording in the control channel. As a result, a wavelength of this frequency will be slightly different from the peripheral distance between two successive electro-magnetic record-reproduce head elements. Thus, the second pass on the tape in the control channel will not be exactly in phase with the first. For small variations in phase, the magnetic pattern due to this "double writing" will be essentially sinusoidal and will have a resultant phase some place between the true phase of the first and second recordings depending upon the magnetic properties of the tape.

This is illustrated graphically in Fig. 6a in which for recording operation abscissae represent distance along the tape and for reproduce operations they represent time. Ordinances represent the phase of the $x$ motion magnetization pattern with respect to the reference magnetization pattern. This $x$ motion pattern of magnetization illustrated in Fig. 6a may be considered to be the pattern which is produced by the longitudinal feed selsyn 10. The straight line $Xa$—$Xb$—$Xc$, represents the true change in phase relationship which should have been recorded along the tape for an $x$ motion at constant speed. Instead, a phase relationship represented by the line $Xa$—$Xd$, is first recorded and then the relationship $Xf$—$Xb$ is recorded over it on the section of the tape that is represented by the distance between the abscissae of the points $Xa$ and $Xd$. In a similar manner, the phase relationships $Xb$—$Xg$ and $Xh$—$Xc$ are consecutively recorded on the next section of the tape. If the magnetic properties of the tape are such that the resultant phase in the event of multiple recording can be approximated by the average phase (which is herein assumed), then the resultant phase of the recordings in both sections of the tape are represented by lines $Xk$—$Xl$ and $Xm$—$Xn$. It will be noted that the maximum departure of the phase relationship indicated by the lines $Xk$—$Xl$, and $Xm$—$Xn$, from the true phase relationship which should have been recorded is one-fourth the change of position from $Xa$ to $Xb$ which is the distance to be traveled by the program in one cycle of the reference alternating voltage at synchronous playback speed, i. e., for one wavelength of the reference magnetization pattern.

Even though this position-time relationship error is very small, in a manner similar to that described in connection with the playback operation, it does not indicate an actual relative position error. In Fig. 6b is shown a plot of the $y$ motion versus time which is similar to the $x$ motion, except that in the interval being studied, the $y$ motion is moving at half the speed of the $x$ motion. The resultant phase relationship is described by the lines $Yk$—$Yl$ and $Ym$—$Yn$. If the $x$ position phase relationship is plotted against the $y$ position phase relationship, then the actual position commands which will be transmitted to the control system when the tape is played back will be represented by the lines P—Q and R—S in Fig. 6c. The true focus desired is, of course, a straight line from the O to F such that the change in X is twice the change in Y. The lines P—Q and R—S lie on this straight line.

Although a record-reproduce head assembly having two electro-magnetic record-reproduce elements per channel and with 180 degrees of tape contact has been illustrated and described, it will be understood that similar results could have been obtained with three electro-magnetic record-reproduce units and 120 degrees of tape contact, four electro-magnetic record-reproduce units and 90 degrees of contact, or in general $n$ record-reproduce elements and $$\frac{360 \text{ degrees}}{n}$$

of contact. Under these conditions, the ratio of the gearing to the record-reproduce head assembly would have to be changed so that the relative speed of the tape and the surface of the head assembly always remain the same.

In the record-reproduce head assembly illustrated in Fig. 1B, the peripheral spacing of the electro-magnetic record-reproduce elements is equal to one wave-length of the reference pattern magnetization. This is correct if the polarity of the coil connections and/or the magnetic circuit configuration are such that under recording conditions, with the coils excited, the leading edge of all record-reproduce element air gaps have the same instantaneous magnetic polarity. However, the magnetic configuration and/or coil connections can be arranged so that the leading edges have alternate polarities. With this arrangement, the record-reproduce elements may be spaced one-half wavelength apart. A record-reproduce head assembly of this character is illustrated in Figs. 3 and 4. This construction requires only one coil for 8 gaps, spaced one-half wavelength apart. The core structure is made in two separate portions 95 and 96 which are separated from each other axially as illustrated in Fig. 3. The construction resembles the construction of the two portions of a jaw clutch with the fingers in engagement. The coil 97 surrounds the central portion of the core as illustrated in Fig. 4. Thus when the coil is excited, the portion 95 of the core is magnetized to one polarity, for example, south, and the portion 96 of the core is magnetized to the opposite polarity. Thus the leading edges of consecutive air gaps 98, 99, 100, etc., have alternate polarities and consequently the spacing may be such that air gaps are but one-half wavelength of the reference pattern magnetization apart.

With this head construction the arc of tape contact must be at least sufficient to reach between successive air gaps which in this case is one-half wavelength. The arc of tape contact need not be restricted to this minimum value but may extend to any integral multiple of this distance and even to fractional multiples greater than unity, particularly when the number of gaps becomes large.

Although the system of drum and transport rolls is illustrated in Fig. 1B as being driven by means of an adjustable speed motor, a constant speed motor and a mechanical differential device, alternative forms of drive may be used which produce the same result. The essential requirement of constant frequency of the reference voltage regardless of program speed is that the relative peripheral surface speed of the drum with respect to the tape must be constant. Stated in other words, the speed at which the tape slips with respect to the drum must remain constant. This may be stated in the following simple mathematical relationship:

(1) $$S_T - S_R = S_S = K$$

where $S_T$=surface speed of transport rolls in forward direction
$S_R$=surface speed of record-playback head drum in forward direction
$S_S$=relative surface speed of tape and periphery of record-playback drum which is to be held constant (K).

Although it is desirable that $S_S$ should remain absolutely constant in order that the reference frequency shall remain absolutely constant, a small variation of this speed, e. g., ±1% may be tolerated. This variation in $S_S$ during playback, for example, produces a slight change, e. g., ±1% in the frequency of the reference voltage, but this small change produces only minor errors in the phase shift networks which do not result in any significant errors in the playback. A variation in $S_S$ during recording may cause a wavelength on the tape to be slightly different from the peripheral distance between two gaps of similar polarity configuration on the drum. On subsequent playbacks this causes a slight disturbance at head commutation on the reference channel somewhat similar to that experienced on a position or motion channel. Again if the speed is reasonably close, as previously suggested, this would not produce intolerable error and there is no cumulative effect.

Since absolute constancy of $S_S$ is not necessary, any drive system that holds the relative speed of the tape and surface of the drum reasonably constant may be used. For example, it may be desirable to eliminate the mechanical differential device which together with the constant speed motor 72 guarantees fulfillment of Equation 1 in the drive scheme illustrated in Fig. 1B. This is accomplished by motoring both the drum and the transport roll system by separate adjustable speed drives and effecting the restraint of freedom of their independent speed possibilities defined in Equation 1 by electrical interconnections.

Figure 7:
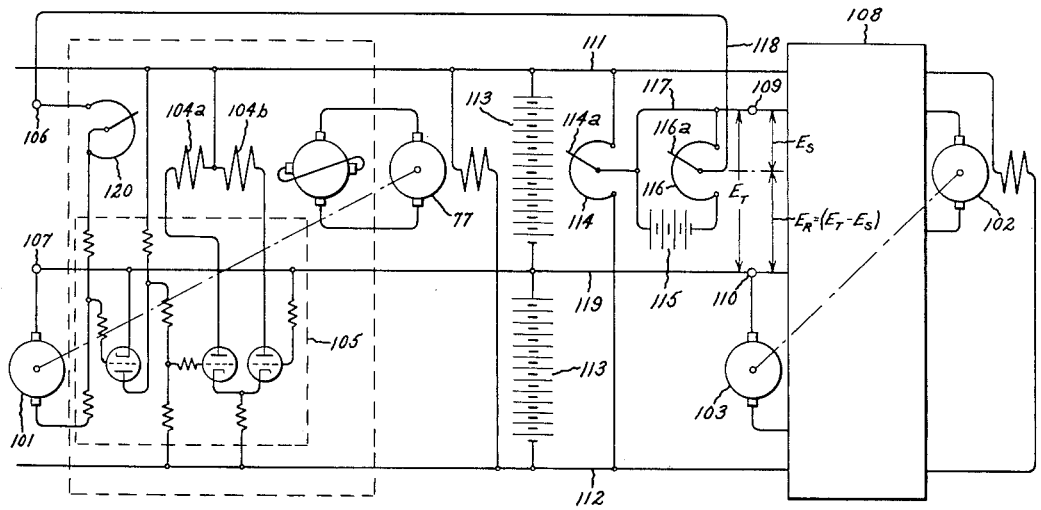
Figs. 7, 8 and 9 are modifications of the electrical control system.

For example, the adjustable speed motor 77 of Fig. 1B may remain connected to the drum 42 as shown, but the shaft 69 will be disconnected from the differential device 67 and a D.-C. tachometer generator 101 will be connected to the shaft 69. The electrical connection of the tachometer generator 101 is shown in Fig. 7. The mechanical differential device 67 and the constant speed motor 72 are removed and a D.-C. shunt motor 102 which is similar to the adjustable speed motor 77 is provided together with a D.-C. tachometer generator 103 mounted on a shaft. The shaft of the motor 102 is also directly coupled to the shaft 65 of Fig. 1B which is connected through gearing 64, 62, and 63 to drive the transport rolls 43, 44, 45, and 46.

Each of the motors 77 and 102 is supplied and controlled by means of a speed control system such as shown in Fig. 7. The speed control system for the motor 77 is illustrated as comprising an amplidyne generator 104, together with a suitable electronic valve amplifier 105 which compares the voltage of the tachometer generator 101 which is representative of the actual speed of the motor 77 with a reference voltage across the terminals 106 and 107 which is representative of the desired speed of the motor, and causes the error to be amplified and the excitation of the amplidyne field windings 104a and 104b varied in such direction as to reduce the error between the desired speed and the actual speed to an acceptable low value. The control 108 for the adjustable speed motor 102 which drives the transport rolls is identical with the control for the motor 77 which drives the drum and is therefore illustrated conventionally in Fig. 7.

To provide the reference voltages which are supplied to the terminals 106 and 107 for controlling the motor 77 and to the terminals 109 and 110 a suitable source of adjustable reference voltage source is provided. It is illustrated as comprising a pair of positive and negative supply conductors 111 and 112 which are supplied from a suitable source of constant voltage such as represented by the battery 113. A potentiometer 114 is connected across the supply conductors 111 and 112. To the slider 114a of the potentiometer 114 is connected the positive terminals of a battery 115 which has no other connection to the battery 113 or supply conductors 111 and 112. Across the battery 115 is connected a potentiometer 116 having a slider 116a. The slider 114a of potentiometer 114 is connected to a conductor 117 which in turn is connected to the terminal 109 of the control 108 for the tape transport roll motor 102. Similarly, the slider 116a of potentiometer 116 is connected to a conductor 118 which is connected to the terminal 106 of the control for the drum drive motor 77. An intermediate point of the battery 113 is connected to conductor 119 which is connected to the terminal 107 for the control of motor 77 and to the terminal 110 of the control 108 for the tape transport roll. Initially, the adjustable resistor 120 in the control system for the drum drive motor 77 and the corresponding adjustable resistor (not shown) in the control 108 for the tape transport roll motor 102 are adjusted so that the same input voltage to each control produces the same surface speed at the transport rolls of the two drives. The slider 114a is adjusted so that the voltage $E_T$ between the conductor 117 and the conductor 119 equals zero. This causes the tape transport roll motor 102 to stop and consequently the tape transport speed $S_T$ is zero.

Next the slider 116a of potentiometer 116 is adjusted until the speed of the drum 42 sliding past the stationary tape 47 is equal to the required "synchronous speed" of the tape. This synchronous speed is such that the frequency of the reference voltage in cycles per second multiplied by the peripheral distance between such air gaps on the drum, as have leading edges of the same instantaneous magnetic polarity, equals the distance traveled in one second. The position of the slider 116a may then be locked and need not be changed again.

The program speed may now be adjusted by adjusting the slider 114a to obtain either a forward or backward transport of the tape. From the foregoing, it is seen that whatever the tape transport speed voltage $E_T$ may be, the speed of the drum motor 77 will be proportional to $E_T - E_S$ to satisfy the original requirements. With a control of this general type, a constancy of speed of the order of .1% to .01% may be expected which is well within the accuracy requirements of this type of control system.

A simpler but sufficiently accurate control system for the drum drive motor 77 and the tape roll transport motor 102 is illustrated in Fig. 8. In this modification, the two motors 77 and 102 have their armature voltages supplied from two adjustable voltage generators 121 and 122. The field windings 77a and 102a of the motors 77 and 102, respectively, are supplied with constant voltage excitation from a suitable source such as that represented by the battery 123. A suitable driving means such, for example, as the induction motor 124 drives the generators 121 and 122 at a speed which is preferably substantially constant. Adjustment of the generator voltages $E_S$ of the generator 121 and $E_T$ of the generator 122 is obtained by adjustment of the voltages supplied to their field windings 121a and 122a by means of potentiometers 125 and 126, respectively, which are connected across the terminals of the battery 123. This drive makes use of the fact that the speed of a D.-C. shunt motor, particularly if lightly loaded and designed with low armature resistance, is essentially proportional to its armature voltage. Thus, with the control properly adjusted the voltage $E_S$ of the generator 121 may be initially adjusted to provide the required difference voltage $E_T - E_S$ at the terminals of the motor 77 to provide the required constant difference in speed between the two motors. Thereafter manipulation of the single potentiometer 125 which effects control of the tape transport speed allows the program speed to be changed as desired while maintaining the necessary speed relationships between the motors as defined by Equation 1.

Figure 9:
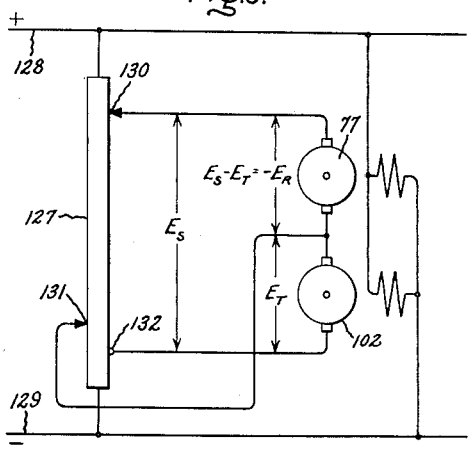

A still simpler but sufficiently accurate modification of this differential speed drive is illustrated in Fig. 9. In this modification the shunt D.-C. motor 77 is used for driving the drum 42 and the shunt D.-C. motor 102 is used for driving the tape transport rolls as in the two modifications illustrated in Figs. 7 and 8. These two motors are supplied from a large power potentiometer 127 which is connected across a suitable source of direct voltage supply such as represented by the positive and negative supply conductors 128 and 129, respectively. The armature of the drum drive motor 77 is connected across a portion of the potentiometer 127 by means of two sliding contacts 130 and 131 to which the armature terminals are respectively connected. Similarly, the armature of the tape transport roll motor 102 is connected between the sliding contact 131 and a fixed contact 132 on the potentiometer 126. Thus the difference between the voltages which are applied to the two motors 77 and 102 is equal to the difference between the voltages of the movable contact 130 and the fixed terminal 132. The movable contact 130 may be initially adjusted so that the difference voltage $E_S$ has the proper value to provide desired relative speed between the drum which is driven by the motor 77 and the tape transport rolls which are driven by the motor 102. Thereafter the movable contact 130 remains in this position and the difference voltage remains constant. Consequently, the difference in speeds of the two motors remains constant, because the difference between the voltage $E_T$ across the motor 102 and the voltage across the drum drive motor 77 remains constant at the value $E_S$. The slider 131 may be moved to vary the voltage $E_T$ and thus to vary the speed of the motor 102 and consequently the speed of the tape transport rolls. The speed of the motor 77 which drives the drum is simultaneously changed.

Although in accordance with the provisions of the patent statutes this invention has been described as embodied in concrete form and the principle of the invention has been described together with the best mode in which it is now contemplated applying that principle, it will be understood that the construction shown and described is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. A magnetic tape programming control system comprising in combination a recording and playback head assembly having a plural section rotatably mounted drum, supply rolls and delivery rolls for transporting a plural channel magnetic tape over said drum in contact with a portion of its curved surface, a plurality of recording and reproducing coils mounted on each section of said drum in proximity to said curved surface and circumferentially disposed from each other by equal angular amounts, means for supplying to the coils of one of said sections a reference alternating voltage of constant frequency, means for supplying to the coils of another of said sections a control alternating voltage of variable phase relationship with respect to said reference voltage and electric motor driving means for said drum and transport rolls for effecting relative movement of said tape and said drum to cause to be recorded on said tape a reference pattern of alternating polarity magnetization of constant wave length for all speeds of said tape and a control pattern of alternating polarity magnetization of variable phase relationship with respect to said reference pattern.

2. A magnetic tape programming control system comprising in combination a recording and playback head assembly having a plural section rotatably mounted drum, supply rolls and delivery rolls for transporting a plural channel magnetic tape over said drum in contact with a portion of its curved surface, a plurality of recording and reproducing coils mounted on each section of said drum in proximity to said curved surface and circumferentially disposed from each other by equal angular amounts, means for supplying to the coils of one of said sections a reference alternating voltage of constant frequency, means for supplying to the coils of another of said sections a control alternating voltage of variable phase relationship with respect to said reference voltage, a pair of electric motors for driving said drum and said transport rolls, and interconnections between said motors for effecting relative motion of said tape and said drum at constant speed to cause to be recorded on said tape a reference pattern of alternating polarity magnetization of constant wave length for all speeds of said tape and a control pattern of alternating polarity magnetization of variable phase relationship with respect to said reference pattern.

3. A magnetic tape programming control system comprising in combination a recording and playback head assembly having a plural section rotatably mounted drum supply rolls and delivery rolls for transporting a plural channel magnetic tape over said drum in contact with a portion of its curved surface, a plurality of recording and reproducing coils mounted on each section of said drum in proximity to said curved surface and circumferentially disposed from each other by equal angular amounts, means for supplying to the coils of one of said sections a reference alternating voltage of constant frequency, means for supplying to the coils of another of said sections a control alternating voltage of variable phase relationship with respect to said reference voltage, an electric motor connected to drive said drum, a second electric motor connected to drive said transport rolls and interconnections between said motors for effecting relative movement of said tape and said drum at a constant difference in their speeds to cause to be recorded on said tape a reference pattern of alternating polarity magnetization of constant wave length for all speeds of said tape and a control pattern of alternating polarity magnetization of variable phase relationship with respect thereto.

4. A magnetic tape programming control system comprising in combination a recording and playback head assembly having a plural section rotatably mounted drum, supply rolls and delivery rolls for transporting a plural channel magnetic tape over said drum in contact with a portion of its curved surface, a plurality of recording and reproducing coils mounted on each section of said drum in proximity to said curved surface and circumferentially disposed from each other by equal angular amounts, means for supplying to the coils of one of said sections a reference alternating voltage of constant frequency, means for supplying to the coils of another of said sections a control alternating voltage of variable phase relationship with respect to said reference voltage, an electric motor connected to drive said transport rolls, a second electric motor connected to drive said drum, one of said motors being an adjustable speed motor, and differential interconnections between said motors for effecting relative motion of said tape and said drum at a constant difference in their speeds to cause to be recorded on said tape a reference pattern of alternating polarity magnetization of constant wave length for all speeds of said adjustable speed motor and a control pattern of alternating polarity magnetization of variable phase relationship with respect to said reference pattern.

5. A magnetic tape record playback control system comprising in combination, a recording and playback head assembly comprising a rotatably mounted drum having a plurality of axially disposed sections, supply rolls and delivery rolls for transporting a plural channel magnetic tape over said drum in contact with a portion of its curved surface, a pair of recording and reproducing coils mounted on each of said sections in proximity to said curved surface and circumferentially disposed 180 degrees from each other, a source of periodically varying voltage for supplying to the coils of one of said sections a reference alternating voltage of constant frequency, means for supplying to the coils of another of said sections a control alternating voltage of variable phase relationship with respect to said reference voltage, a pair of electric motors for driving said drum and said transport rolls, one of said motors being an adjustable speed motor, and differential interconnections between said motors for effecting relative motion of said tape and said drum at a constant difference in their speeds to cause to be recorded on said tape a reference pattern of alternating polarity magnetization of constant wave length for all speeds of said adjustable speed motor and a control pattern of alternating polarity magnetization of variable phase relationship with respect to said reference pattern.

6. A magnetic tape record playback control system comprising in combination, a recording and playback head assembly comprising a rotatably mounted drum having a plurality of axially disposed sections, supply rolls and delivery rolls for transporting a plural channel magnetic tape over said drum in contact with a portion of its curved surface, a plurality of recording and reproducing coils mounted on each of said sections in proximity to said curved surface and circumferentially disposed equal angular amounts from each other, a source of periodically varying voltage for supplying to the coils of one of said sections a reference alternating voltage of constant frequency, means for supplying to the coils of another of said sections a control alternating voltage of variable phase relationship with respect to said reference voltage, a mechanical differential device having an output member connected to drive said transport rolls and first and second input members, a constant speed motor connected to drive said first input member and an adjustable speed motor having driving connections to said drum and to said second input member for effecting relative motion of said tape and said drum at a constant difference in their speeds to cause to be recorded on said tape a reference pattern of alternating polarity magnetization of constant wave length for all speeds of said adjustable speed motor and a control pattern of alternating polarity magnetization of variable phase relationship with respect to said reference pattern.

7. A magnetic tape record playback control system comprising in combination a recording and playback head assembly comprising a rotatably mounted drum having a plurality of axially disposed sections, supply rolls and delivery rolls for transporting a magnetic tape over said drum in contact with a portion of its curved surface, a plurality of recording and reproducing coils mounted on each of said sections in proximity to said curved surface and circumferentially disposed equal angular amounts from each other, a source of periodically varying voltage for supplying to the coils of one of said sections a reference alternating voltage of constant frequency, means for supplying to the coils of another of said sections a control alternating voltage of variable phase relationship with respect to said reference voltage, an adjustable speed motor for driving said drum, a second adjustable speed motor for driving said rolls, and electrical interconnections between said motors for effecting relative motion of said tape and said drum at a constant difference in their speeds to cause to be recorded on said tape a reference pattern of alternating polarity magnetization of constant wave length for all speeds of said motors and said tape and a control pattern of alternating polarity magnetization of variable phase relationship with respect to said reference pattern.

8. A magnetic tape record playback control system comprising in combination a recording and playback head assembly comprising a rotatably mounted drum having a plurality of axially disposed sections, supply rolls and delivery rolls for transporting a magnetic tape over said drum in contact with a portion of its curved surface, a plurality of recording and reproducing coils mounted on each of said sections in proximity to said curved surface and circumferentially disposed equal angular amounts from each other, a source of periodically varying voltage for supplying to the coils of one of said sections a reference alternating voltage of constant frequency, means for supplying to the coils of another of said sections a control alternating voltage of variable phase relationship with respect to said reference voltage, means for producing relative motion of said drum and said tape to cause to be recorded thereon a reference pattern of alternating polarity magnetization having a predetermined integral number of wave lengths per unit length of tape equal to the circumference of said drum for all speeds of said tape and a control pattern of alternating polarity magnetization of variable phase relationship with respect to said reference pattern comprising a pair of electric motors for driving said drum and said transport rolls, one of said motors being an adjustable speed motor, and interconnections between said motors for effecting relative motion of said tape and said drum at a constant difference in their speeds.

9. A magnetic tape record playback control system comprising in combination a recording and playback head assembly comprising a rotatably mounted drum having a plurality of axially disposed sections, supply rolls and delivery rolls for transporting a magnetic tape over said drum in contact with a portion of its curved surface, a plurality of recording and reproducing coils mounted on each of said sections in proximity to said curved surface and circumferentially disposed equal angular amounts from each other, a source of periodically varying voltage for supplying to the coils of one of said sections a reference alternating voltage of constant frequency, means for supplying to the coils of another of said sections a control alternating voltage of variable phase relationship with respect to said reference voltage, means for producing relative motion of said drum and said tape to cause to be recorded thereon a reference pattern of alternating polarity magnetization having a predetermined integral number of wave lengths per unit length of tape equal to the circumference of said drum for all speeds of said tape and a control pattern of alternating polarity magnetization of variable phase relationship with respect to said reference pattern comprising an adjustable speed electric motor connected to drive said transport rolls, a second adjustable speed motor connected to drive said drum and differential electrical interconnections between said motors for effecting relative motion of said tape and said drum at constant difference in their speeds.

10. A magnetic tape programming control system comprising in combination a recording and playback head assembly having a plural section rotatably mounted drum, supply rolls and delivery rolls for transporting a plural channel magnetic tape over said drum in contact with a portion of its curved surface, a plurality of recording and reproducing coils mounted on each section of said drum in proximity to said curved surface and circumferentially disposed from each other by equal angular amounts, means for supplying to the coils of one of said sections a reference alternating voltage of constant frequency, means for supplying to the coils of another of said sections a control alternating voltage of variable phase relationship with respect to said reference voltage, a pair of adjustable speed electric motors for driving said drum and said transport rolls, a pair of adjustable voltage generators each for supplying a different one of said motors, and differential electrical interconnections between the field windings of said generators for controlling said motors to effect relative motion of said tape and said drum at a constant difference in their speeds to cause to be recorded on said tape a reference pattern of alternating polarity magnetization of constant wave length for all speeds of said tape and a control pattern of alternating polarity magnetization of variable phase relationship with respect to said reference pattern.

11. A magnetic tape programming control system comprising in combination a recording head assembly having a plural section rotatably mounted drum, supply rolls and delivery rolls for transporting a plural channel magnetic tape over said drum in contact with a portion of its curved surface, a plurality of recording coils mounted on each section of said drum in proximity to said curved surface and circumferentially disposed from each other by equal angular amounts, a source of alternating voltage of constant frequency for supplying to the coils of one of said sections a reference alternating voltage, means for supplying to the coils of another of said sections a control alternating voltage of variable phase relationship with respect to said reference voltage, an adjustable speed motor for driving said drum, a second adjustable speed motor for driving said transport rolls, a direct current power potentiometer and adjustable electrical differential connections from said potentiometer to said motors for effecting relative motion of said tape and said drum at a constant difference in their speeds to cause to be recorded on said tape a reference pattern of alternating polarity magnetization of constant wave length for all speeds of said tape and a control pattern of alternating polarity magnetization of variable phase relationship with respect to said reference pattern.

12. A magnetic tape programming control system of which the tape has recorded thereon in one channel a reference pattern of alternating polarity magnetization having a constant number of wave lengths per unit length and in another channel a control pattern of alternating polarity magnetization of variable phase relationship with respect to said reference pattern comprising a playback head assembly having a plural section rotatably mounted drum, supply and delivery rolls for transporting a plural channel magnetic tape over said drum in contact with a portion of its curved surface, a plurality of reproducing coils mounted on said drum in proximity to said curved surface and disposed equal angular amounts from each other, a plurality of external circuits and connections from said coils to said circuits, a pair of electric motors for driving said drum and said rolls and differential interconnections between said motors for effecting relative motion of said tape and said drum at a constant difference in their speeds to cause to be supplied to said external circuits a reference alternating voltage of constant frequency for all speeds of said tape and a control alternating voltage of variable phase relationship with respect to said reference frequency, a device for producing a control operation, and a phase discriminator responsive to the difference in phase of said voltages for producing and supplying a control voltage to said control device to cause said device to perform a program of operations corresponding to the changing phase relationship of said alternating polarity magnetizations on said tape.

13. A magnetic tape programming control system of which the tape has recorded thereon in one channel a reference pattern of alternating polarity magnetization having a constant number of wave lengths per unit length and in another channel a control pattern of alternating polarity magnetization of variable phase relationship with respect to said reference pattern comprising a playback head assembly having a plural section rotatably mounted drum, supply and delivery rolls for transporting a plural channel magnetic tape over said drum in contact with a portion of its curved surface, a plurality of reproducing coils mounted on said drum in proximity to said curved surface and disposed equal angular amounts from each other, a plurality of external circuits and connections from said coils to said circuits, an electric motor connected to drive said drum, a second electric motor connected to drive said transport rolls, one of said motors being an adjustable speed motor and differential interconnections between said motors for effecting relative motion of said tape and said drum at a constant difference in their speeds to cause to be generated in said coils and supplied to said external circuits a reference alternating voltage of constant frequency for all speeds of said tape and a control alternating voltage of variable phase relationship with respect to said reference voltage, a device for producing a control operation and a phase discriminator responsive to the difference in phase of said voltages for producing and supplying a control voltage to said control device to cause said device to perform a program of operations corresponding to the changing phase relationship of said alternating polarity magnetizations on said tape.

14. A magnetic tape programming control system of which the magnetic tape has recorded thereon in one channel a reference pattern of alternating polarity magnetization of constant wave length per unit length of tape and in another channel a control pattern of alternating polarity magnetization of variable phase relationship with respect to said reference pattern comprising a rotatably mounted drum having a plurality of axially aligned sections each having a circumference equal to the length of tape occupied by two wave lengths of said reference pattern, supply and delivery rolls for transporting a magnetic tape over said drum in contact with a portion of its curved surface, a pair of reproducing coils mounted on each of said sections in proximity to said curved surface and circumferentially disposed 180 degrees from each other, a plurality of external circuits, connections from each of said coils to a different one of said circuits, a pair of electric motors for driving said drum and said transport rolls, one of said motors being an adjustable speed motor, and differential interconnections between said motors for effecting relative motion of said tape and said drum at a constant difference in their speeds to cause to be supplied to one of said external circuits a reference alternating voltage of constant frequency for all speeds of said tape and to another of said external circuits a control alternating voltage of variable phase relationship with respect to said reference voltage, a device for producing a control operation and a phase discriminator responsive to the difference in phase of said voltages for producing and supplying to said control device a direct voltage of variable magnitude and reversible polarity to cause said device to perform a program of operations corresponding to the changing phase relationship of said alternating polarity magnetizations on said tape.

15. A magnetic tape programming control system of which the magnetic tape has recorded thereon in one channel a reference pattern of alternating polarity magnetization of constant wave length per unit length of tape and in another channel a control pattern of alternating polarity magnetization of variable phase relationship with respect to said reference pattern comprising a rotatably mounted drum having a plurality of axially aligned sections each having a circumference equal to the length of tape occupied by two wave lengths of said reference pattern, supply and delivery rolls for transporting a magnetic tape over said drum in contact with a portion of its curved surface, a plurality of reproducing coils mounted on each of said sections in proximity to said curved surface and circumferentially disposed equal angular amounts from each other, a plurality of external circuits, connections from each of said coils to a different one of said circuits, a pair of electric motors for driving said drum and said transport rolls and a mechanical differential device interconnecting said motors, said drum and said transport rolls for effecting relative motion of said tape and said drum at a constant difference in their speeds to cause to be supplied to one of said circuits a reference alternating voltage of constant frequency for all speeds of said tape and to another of said circuits a control alternating voltage of variable phase relationship with respect to said reference voltage, a device for producing a control operation and a phase discriminator responsive to the difference in phase of said voltages for producing and supplying to said control device a direct control voltage of variable magnitude and reversible polarity to cause said device to perform a program of operations corresponding to the changing phase relationship of said alternating polarity magnetizations on said tape.

16. A magnetic tape programming control system of which the tape has recorded thereon in one channel a reference pattern of alternating polarity magnetization having a constant number of wave lengths per unit length and in another channel a control pattern of alternating polarity magnetization of variable phase relationship with respect to said reference pattern comprising a playback head assembly having a plural section rotatably mounted drum, supply and delivery rolls for transporting a plural channel magnetic tape over said drum in contact with a portion of its curved surface, a plurality of reproducing coils mounted on said drum in proximity to said curved surface and disposed equal angular amounts from each other, a plurality of external circuits and connections from said coils to said circuits, an adjustable speed motor for driving said drum, a second adjustable speed motor for driving said transport rolls and differential electrical connections between said motors for effecting relative motion of said tape and said drum at a constant difference in their speeds to cause to be supplied to one of said circuits an alternating reference voltage of constant frequency for all speeds of said tape and to the other of said circuits a control alternating voltage of variable phase relationship with respect to said reference voltage, a device for producing a control operation and a phase discriminator responsive to the difference in phase of said voltages for producing and supplying to said control device a variable direct control voltage to cause said device to perform a program of operations corresponding to the changing phase relationship of said alternating polarity magnetizations on said tape.

17. A magnetic tape programming control system of which the tape has recorded thereon in one channel a reference pattern of alternating polarity magnetization having a constant number of wave lengths per unit length and in another channel a control pattern of alternating polarity magnetization of variable phase relationship with respect to said reference pattern comprising a playback head assembly having a plural section rotatably mounted drum, supply and delivery rolls for transporting a plural channel magnetic tape over said drum in contact with a portion of its curved surface, a plurality of reproducing coils mounted on said drum in proximity to said curved surface and disposed equal angular amounts from each other, a plurality of external circuits and connections from said coils to said circuits, a first adjustable speed electric motor for driving said drum, a second electric motor for driving said transport rolls, a pair of adjustable voltage generators each for supplying a different one of said motors and differential electrical interconnections between the armatures of said motors and said generators for effecting relative motion of said drum and said tape at a constant difference in their speeds to cause to be supplied to one of said external circuits a reference alternating voltage of constant frequency for all speeds of said tape and to another of said circuits a control alternating voltage of variable phase relationship with respect to said reference voltage, a device for producing a control operation and a phase discriminator responsive to the difference in phase of said voltages for producing and supplying to said control device a variable direct control voltage to cause said device to perform a program of operations corresponding to the changing phase relationship of said alternating polarity magnetizations on said tape.

18. A magnetic tape programming control system of which the tape has recorded thereon in one channel a reference pattern of alternating polarity magnetization having a constant number of wave lengths per unit length and in another channel a control pattern of alternating polarity magetization of variable phase relationship with respect to said reference pattern comprising a playback head assembly having a plural section rotatably mounted drum, supply and delivery rolls for transporting a plural channel magnetic tape over said drum in contact with a portion of its curved surface, a plurality of reproducing coils mounted on said drum in proximity to said curved surface and disposed equal angular amounts from each other, a plurality of external circuits and connections from said coils to said circuits, a first adjustable speed motor connected to drive said drum, a second adjustable speed motor connected to drive said transport rolls, a pair of adjustable voltage generators, each connected to supply a different one of said motors and differential interconnections between the field windings of said generators for controlling said motors to effect relative motion of said tape and said drum at a constant difference in their speeds to cause to be supplied to one of said external circuits a reference alternating voltage of constant frequency for all speeds of said tape and to cause to be supplied to another of said external circuits a control alternating voltage of variable frequency with respect to said reference voltage, a device for producing a control operation and a phase discriminator responsive to the difference in phase of said voltages for producing and supplying to said control device a variable magnitude direct control voltage to cause said device to perform a program of operations corresponding to the changing phase relationship of said alternating polarity magnetizations on said tape.

19. A magnetic tape programming control system of which the tape has recorded thereon in one channel a reference pattern of alternating polarity magnetization having a constant number of wave lengths per unit length and in another channel a control pattern of alternating polarity magnetization of variable phase relationship with respect to said reference pattern comprising a playback head assembly having a plural section rotatably mounted drum, supply and delivery rolls for transporting a plural channel magnetic tape over said drum in contact with a portion of its curved surface, a plurality of reproducing coils mounted on said drum in proximity to said curved surface and disposed equal angular amounts from each other, a plurality of external circuits and connections from said coils to said circuits, a first adjustable speed motor connected to drive said transport rolls, a second adjustable speed motor connected to drive said drum, a direct current power potentiometer and adjustable electrical differential connections from said potentiometer to said motors for effecting relative motion of said tape and said drum at a constant difference in their speeds to cause to be supplied to one of said external circuits a reference alternating voltage of constant frequency for all speeds of said tape and to be supplied to another of said external circuits a control alternating voltage of variable phase relationship with respect to said reference voltage, a device for producing a control operation and a phase discriminator responsive to the difference in phase of said voltages for producing and supplying to said control device a variable magnitude direct control voltage to cause said device to perform a program of operations corresponding to the changing phase relationship of said alternating polarity magnetizations on said tape.

References Cited in the file of this patent

UNITED STATES PATENTS

| | | |
|---|---|---|
| 2,133,365 | Trofimov | Oct. 18, 1938 |
| 2,436,582 | Lear | Feb. 24, 1948 |
| 2,439,446 | Begun | Apr. 13, 1948 |
| 2,475,245 | Leaver et al. | July 5, 1949 |
| 2,502,215 | Giffen et al. | Mar. 28, 1950 |
| 2,537,770 | Livingston et al. | Jan. 9, 1951 |